United States Patent
Bent et al.

(10) Patent No.: US 7,970,542 B2
(45) Date of Patent: Jun. 28, 2011

(54) METHOD OF DETECTING, LOCATING, AND CLASSIFYING LIGHTNING

(75) Inventors: Rodney B. Bent, Melbourne, FL (US); Robert T. Davis, Melbourne, FL (US)

(73) Assignee: Toa Systems, Inc., Melbourne, FL (US)

( * ) Notice: Subject to any disclaimer, the term of this patent is extended or adjusted under 35 U.S.C. 154(b) by 537 days.

(21) Appl. No.: 12/103,788

(22) Filed: Apr. 16, 2008

(65) Prior Publication Data

US 2008/0262732 A1  Oct. 23, 2008

Related U.S. Application Data

(60) Provisional application No. 60/912,287, filed on Apr. 17, 2007.

(51) Int. Cl.
*G01W 1/00* (2006.01)

(52) U.S. Cl. .......................................................... 702/4

(58) Field of Classification Search ................ 702/4, 94, 702/188, 191; 375/316, 346, 350; 324/76.12, 324/322

See application file for complete search history.

(56) References Cited

U.S. PATENT DOCUMENTS

| | | | |
|---|---|---|---|
| 4,023,408 A | | 5/1977 | Ryan et al. |
| 4,115,732 A | | 9/1978 | Krider et al. |
| 4,198,599 A | | 4/1980 | Krider et al. |
| 4,506,211 A | | 3/1985 | Coleman |
| 4,684,951 A | | 8/1987 | Baumer et al. |
| 4,841,304 A | | 6/1989 | Richard et al. |
| 4,873,483 A | | 10/1989 | Ostrander |
| 5,057,820 A | | 10/1991 | Markson et al. |
| 5,396,220 A | | 3/1995 | Markson et al. |
| 5,483,153 A | * | 1/1996 | Leeb et al. ............... 324/76.12 |
| 6,791,311 B2 | | 9/2004 | Murphy et al. |
| 2002/0087199 A1 | * | 7/2002 | Bange et al. ................ 607/27 |
| 2007/0085525 A1 | | 4/2007 | Jantunen et al. |

* cited by examiner

*Primary Examiner* — Bryan Bui

(74) *Attorney, Agent, or Firm* — Fox Rothschild, LLP; Robert J. Sacco

(57) ABSTRACT

There is discloses a new method for identifying an electromagnetic signal having a known waveform. The method includes using a lightning matched filter receiver having a bank of filters matched to nominal but arbitrary lightning waveforms for detecting lightning. The use of a lightning matched filter receiver facilitates detection of lightning discharges below the noise level. Positioning three or more monitoring stations at different spaced apart geographic locations where each monitoring station has a lightning matched filter receiver where the filters are matched to nominal but arbitrary lightning waveforms can be used to detect and determine the location of a lightning discharge.

24 Claims, 14 Drawing Sheets

METHOD OF DETECTING, LOCATING, AND CLASSIFYING LIGHTNING

CROSS REFERENCES TO RELATED APPLICATIONS

This application claims priority to U.S. Patent Application Ser. No. 60/912,287, filed Apr. 17, 2007, which is hereby incorporated by reference in its entirety.

BACKGROUND OF THE INVENTION

1. Statement of the Technical Field

This invention relates generally to a lightning discharge and more particularly to an improved method and apparatus for detecting, classifying, and locating lightning.

2. Description of the Related Art

A lightning discharge is a natural phenomenon that produces a non-cooperative electrical field waveform which varies drastically in intensity and duration. The lightning discharge, in its entirety, whether it strikes the ground or not, is usually termed a lightning flash or just a flash. A lightning discharge that involves an object on the ground or in the atmosphere is sometimes referred to as a lightning strike. The terms stroke or component stroke apply only to components of cloud to ground discharges. Each stroke involves a downward leader and an upward return stroke and may involve a relatively low level of continuous current that immediately follows the return stroke. Transient processes occurring in a lightning channel while it carries continuing current are termed M-components. First strokes are initiated by stepped leaders while subsequent strokes following previously formed channels are initiated by dart or dart stepped leaders.

The four types of lightning are: A) downward negative lightning; B) upward negative lightning; C) downward positive lightning; and D) upward positive lightning. Discharges of all four types can be viewed as effectively transporting cloud charge to the ground and, therefore, are usually termed cloud to ground (CG) discharges. It is believed that downward negative lightning flashes, type A), account for about 90 percent or more of global cloud to ground lightning, and that 10 percent or less of cloud to ground discharges are downward positive lightning flashes, type C). Upward lightning discharges, types B) and D), are thought to occur only from tall objects (higher than 100 meters) or from objects of moderate height located on mountain tops. The majority of lightning discharges do not involve the ground. These are termed cloud discharges and sometimes are referred to as IC's. Cloud discharges include intra-cloud, inter-cloud, and cloud to air discharges.

Downward negative lightning discharges are discharges that are initiated in a cloud. Initially they develop in an overall downward direction, transport a negative charge to ground, and probably account for about 90 percent of all cloud to ground discharges.

Positive flashes are defined as those transporting positive charge from cloud to earth. It is thought that less than 10 percent of global cloud to ground lightning is positive.

Upward lightning discharges are initiated by leaders that originate from stationary grounded objects, usually tall towers, and propagate upward toward charged clouds overhead. Upward lightning, as opposed to normal downward lightning, would not occur if the object were not present and, therefore, can be considered to be initiated by the object. Objects with heights ranging from approximately 100 to 500 meters experience both downward and upward flashes, where the number of upward flashes increases with the height of the object. Structures which are less than 100 meters or so are usually assumed to be struck only by downward lightning, and structures with heights greater than 500 meters or so are usually assumed to experience only upward flashes.

The term cloud discharge is used to denote three types of lightning: I) intra-cloud discharge, those occurring within the confines of a thundercloud; II) inter-cloud discharges, those occurring between thunderclouds; and III) air discharges, those occurring between a thundercloud and clear air. It is thought that the majority of cloud discharges are of the inter-cloud type, although no reliable statistical data are found in the literature to confirm that this is the case. Often the abbreviation IC (for intra-cloud) is used to refer to all cloud flashes. It is reported that intra-cloud and cloud to air lightning discharges produce similar overall electric field charges. Approximately three-quarters of lightning discharges do not contact the ground, although this fraction depends on the storm type, the stage of storm development, and possible other factors. The early stages of thunderstorm development tend to be dominated by cloud discharges. Ten of more cloud flashes may occur before the first cloud to ground flash occurs.

A variety of systems and methods have been developed for identifying the occurrence and location of lightning, such as cloud to ground lightning, intra-cloud lightning and Inter-cloud lightning. Currently, lightning discharges are detected using envelope detection or amplitude threshold techniques which are limited to detection above the noise level.

In prior art lightning detection systems, three or more sensors are spaced apart to remotely detect the electric and magnetic fields of lightning discharges. Such discharges may be between a cloud and the ground (CG) or within a cloud (IC). Information from the sensors is transmitted to a central location, where analysis of the sensor data is performed. Typically, at least the time of occurrence and location of the discharges are determined from data provided by the sensors.

Remote sensors of lightning detection and data acquisition systems typically detect electric and magnetic fields of both CG and IC lightning flashes, which are composed of many discharges. It is important to be able to distinguish between the two types of flashes. To that end, remote sensors often look at the low frequency (LF) and very low frequency (VLF) emissions from lightning discharges. The electrical signals produced by LF and VLF detectors are ordinarily integrated prior to analysis to produce a waveform representation of the electric or magnetic discharge field, as the antenna inherently responds to the time derivative of the field. Analyzing signals representative of either an electric or magnetic field to distinguish CG and IC discharges is referred to as performing waveform analysis. There are several criteria for distinguishing between CG and IC events. One well known method of distinguishing lighting signals both in the LF and in the VLF range is to examine the time that passes from a peak in a representative signal to the instant it crosses a zero amplitude reference point. This is referred to as a peak to zero (PTZ) method of analysis. A relatively short PTZ time is a good indication that an IC discharge has occurred.

Another well known method of distinguishing is referred to as a bipolar test wherein the representative signal is examined for a first peak and a subsequent peak of opposite polarity which is greater than a predetermined fraction of the first peak. Such an occurrence is another good indication of an IC discharge. Yet another test for IC discharges is the presence of subsequent peaks of the same polarity in a representative signal greater than the initial peak. This is predicated on the fact that some IC discharges have a number of small and fast leading electromagnetic pulses prior to a subsequent larger and slower pulse. In the absence of such criteria indicating that the discharge is an IC discharge, it is ordinarily assumed to be a CG discharge. Even with the application of all established criterion for distinguishing between CG and IC events, some events are still misclassified.

An alternate method of lightning detection is to monitor very high frequency (VHF) radiation from lightning discharges. However, VHF detection systems must be able to process information at extremely high data rates, as VHF pulse emissions in IC lightning occur approximately one tenth of a millisecond apart. Additionally, VHF systems can only detect lightning events that have direct line of sight to the sensor. One such system is currently in use by NASA at Kennedy Space Center in Florida. However, this system is further restricted to line of sight between the sensors and the central analyzer as it uses a real time microwave communication system.

Analog sensors operating at LF and VLF frequencies are difficult to tune for both CG and IC lightning discharges. The median amplitude of a CG field signal is about an order of magnitude greater than the median amplitude of an IC field signal. Optimizing the gain of one of these sensors to detect IC events often causes the sensor to become saturated with the much greater energy of nearby CG lightning discharges. Therefore, it is customary to adjust the gain to accommodate both types of field signals, reducing a sensor's ability to detect IC events. As distant IC lightning discharges become attenuated by propagation over the ground, they become difficult to distinguish from background environmental noise.

Once a lightning occurrence is detected, several different methods can be used for determining the location of the lightning strike. One such method employs a time difference of arrival (TDOA) discrimination scheme. Systems using this method typically include three or more monitoring stations which are geographically separated by some distance. Each station includes a lightning stroke detector and a timing signal generator synchronized with the timing signal generator at each other respective detection location. When a lightning stroke occurs, the time of detection of the ground stroke is recorded at each station. This timing information is communicated from each of the monitoring stations to a central processing station. By using timing data from each monitoring station, the location of the lighting stroke can easily be determined. For example, in the case where four monitoring stations are used, an algorithm for determining the location of the ground stroke is fairly simple, being reduced to the solution of a set of linear equations.

The state of the art of lightning detection and data acquisition systems is generally represented, in part, by several patents. Krider et al. U.S. Pat. Nos. 4,198,599 and 4,245,190 describe a network of gated wideband magnetic direction finding sensors. These sensors are sensitive to return strokes in CG lightning flashes. In U.S. Pat. No. 4,198,599, discrimination and classification is accomplished by examining the shape of the time-domain field waveform. A short rise time (time from threshold to peak) results in a representative signal being placed in an analog track and hold circuit while further analysis is performed. These sensors are designed with CG discharges being of primary interest. Any IC lightning discharges that are detected are discarded. However, both CG and IC events that meet the short rise time criteria and a simple test of event duration result in a significant amount of sensor dead-time.

Another patent of interest is Markson et al. U.S. Pat. No. 6,246,367 wherein a lightning detection system utilizes an analog-to-digital converter ("ADC") to provide continuous processing of representative field signals. Markson describes using a bipolar comparator to distinguish between positive and negative polarity versions of a particular pulse that is inferred to be the first broadband radiation pulse in either a CG or an IC flash. Markson also uses a data correlation process and time-of-arrival difference location method. Markson explicitly uses a high pass filter to block most low frequency components of representative field signals, which are not necessarily useful for detecting the initial pulse in the flash. Limitations of the Markson patent are the specific use of the HF frequency range and detection and processing of only the first pulse in each flash.

Accordingly, there is a need for improved lightning detection and data acquisition systems in several respects. First, an improved signal conditioning method is needed. CG events are normally an order of magnitude larger than IC events at LF, due to the channel length and amount of current which flows during a CG return stroke. Increasing the gain, or equivalently reducing the event threshold, results in CG events saturating an analog detection and evaluation system or the pick-up of significant amounts of noise. Reducing the gain, or equivalently increasing the event threshold, results in inefficient detection that masks IC events. There is a need to reduce the effect of this magnitude difference between CG and IC signals while removing unwanted noise components. An interesting aspect of both electric field and magnetic field antennae is that they produce a signal which is proportional to the time derivative of the electromagnetic field they are detecting. These differentiating antennae actually reduce the magnitude disparity between IC and CG differential representative signals. However, current generation sensors invariably impose integration methods to convert the differentiated field signal to one representative of the electromagnetic field without making use of the fact that the antenna itself reduces dynamic range requirements. Additionally, there is a need for an improved classification method for distinguishing between lightning types.

Another need in the industry is the ability to program remote sensors with new or different waveform analysis techniques.

Thus, a need exists for a complete lightning detection system which can detect CG and IC events and determine their location, magnitude, and time of occurrence.

SUMMARY OF THE INVENTION

The invention concerns a method for identifying a source location of lightning. The method begins by positioning three or more monitoring stations at different spaced apart geographic locations. Each monitoring station includes a matched filter receiver. Responsive to a lightning occurrence, a signal is received at each of the matched filter receivers. The method continues in each matched filter receiver with communicating the signal to a plurality of matched filters. Each of the matched filters has a filter characteristic matched to a different one of a plurality of nominal but arbitrary lightning waveforms corresponding to a type of lightning occurrence. According to one aspect of the invention, the nominal but arbitrary lightning waveforms are selected from the group comprising cloud-to-ground type lightning and cloud-to-cloud type lightning.

The method can also include scaling the signal energy in a filter channel respectively provided for each of the matched filters to compensate for known predetermined unequal signal energy associated with each the type of lightning occurrence.

At each of the monitoring stations, a time stamp value is generated and assigned to a peak output of one of the plurality of matched filters. In particular, the time stamp value is assigned to the output having the largest correlation value among a plurality of outputs of the plurality of matched filters. The method also includes communicating the time stamp value assigned at each of the plurality of matched filter receivers to a central processor. A source location of the lightning is thereafter determined based on the time stamp values.

The method also includes generating in each of the matched filter receivers a channel assignment identification data specifying a lightning type. The lightning type is based on a determination of which of the plurality of matched filters has the largest correlation value among a plurality of outputs of the plurality of matched filters. The channel assignment identification data is communicated to the central processor from at least one of the monitoring stations.

The method also includes the step of synchronizing a time stamp generator at each of the monitoring stations. Notably, the time stamp can be an absolute time value, or a time offset value representing a timing offset relative to a time synchronization signal. At the central processor, a position of the source location can be calculated using the time offset communicated from each of the plurality of matched filter receivers. A time difference of arrival of the signal at each matched filter receiver in such instance is based on a difference in the time offsets.

According to another aspect, the invention includes a system for identifying a source location of lightning. The system includes three or more monitoring stations positioned at different spaced apart geographic locations. Each of the monitoring station includes a matched filter receiver comprising a radio signal receiver coupled to a plurality of matched filters. Each of the matched filters has a filter characteristic matched to a different one of a plurality of nominal but arbitrary lightning waveforms corresponding to one of a plurality of different types of lightning occurrences. For example, the nominal but arbitrary lightning waveforms can be selected from the group comprising cloud-to-ground type lightning and cloud-to-cloud type lightning.

The matched filter receiver also advantageously includes scaling circuits for scaling a signal energy in a filter channel respectively provided for each of the matched filters to compensate for known predetermined unequal signal energy associated with each the type of lightning occurrence.

A time stamp generator is provided in each monitoring station for generating a time stamp value. The monitoring station also includes means for assigning the time stamp value to a peak output of one of the plurality of matched filters having the largest correlation value among a plurality of outputs of the plurality of matched filters. A data transceiver is also provided for communicating the time stamp value to a central processor that has been configured for determining the source location based on the time stamp values.

Each lightning matched filter receiver also includes a channel assignment identification circuit. The channel assignment identification circuit generates in each of the matched filter receivers a channel assignment identification data specifying a lightning type. The lightning type is based on a comparison of correlation value output from the plurality of matched filters.

The monitoring station further includes at least one timing system for receiving and extracting a timing synchronization signal for synchronizing a time stamp generator. The time stamp can be an absolute time value or a time offset value representing a timing offset relative to the time synchronization signal.

DETAILED DESCRIPTION OF THE PREFERRED EMBODIMENTS

The invention will now be described more fully with reference to the accompanying drawings, in which illustrative embodiments of the invention are shown. This invention may, however, be embodied in many different forms and should not be construed as limited to the embodiments set forth herein. For example, the present invention can be embodied as a method, a data processing system, or a computer program product. Accordingly, an embodiment of the present invention can be entirely in the form of hardware, or entirely in the form of software, or in the form of hardware in combination with software.

Figure 1:
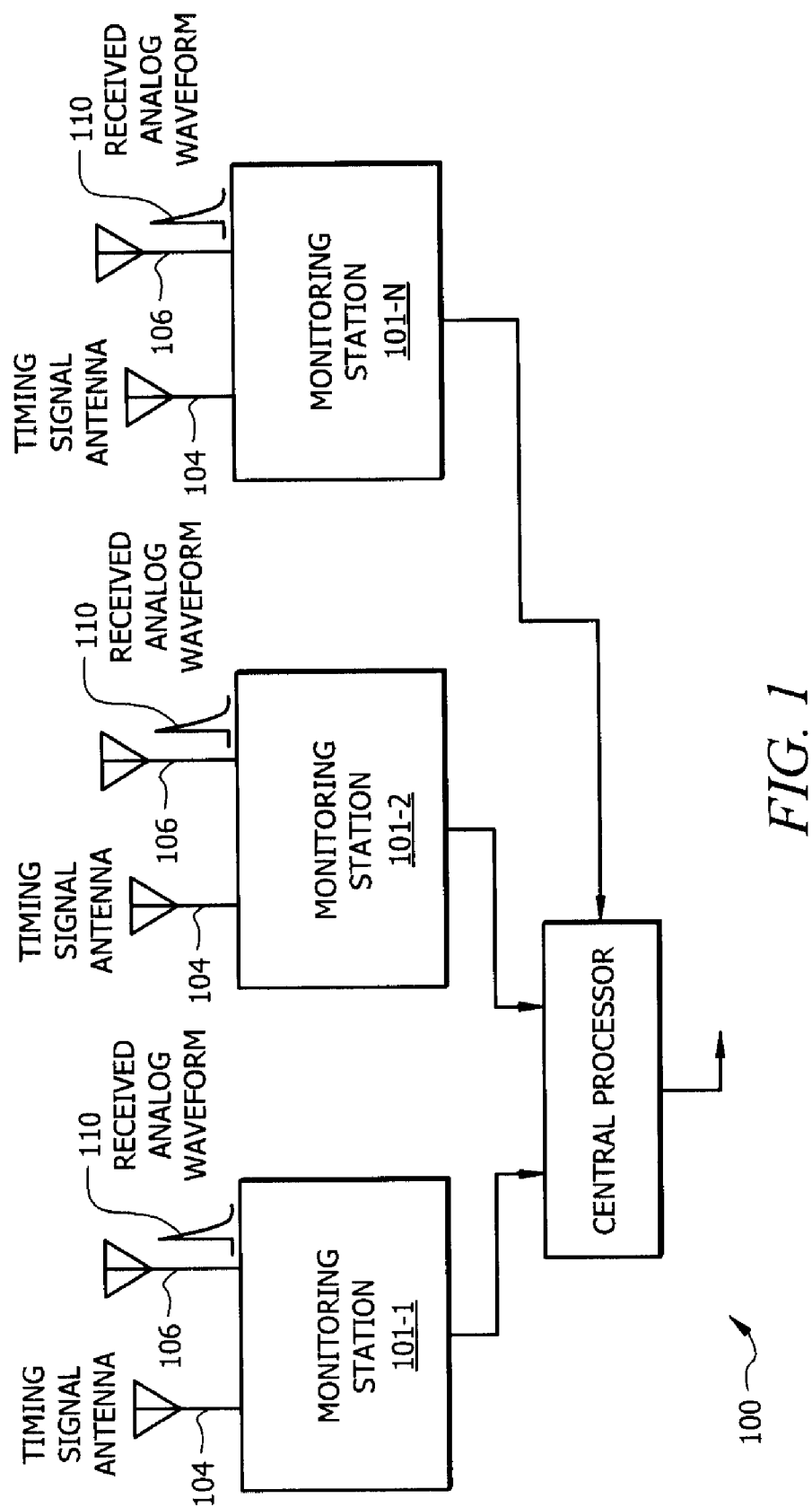
FIG. 1 is conceptual block diagram that is useful for understanding a time difference of arrival system for locating a source of electromagnetic energy.
Figure 27:
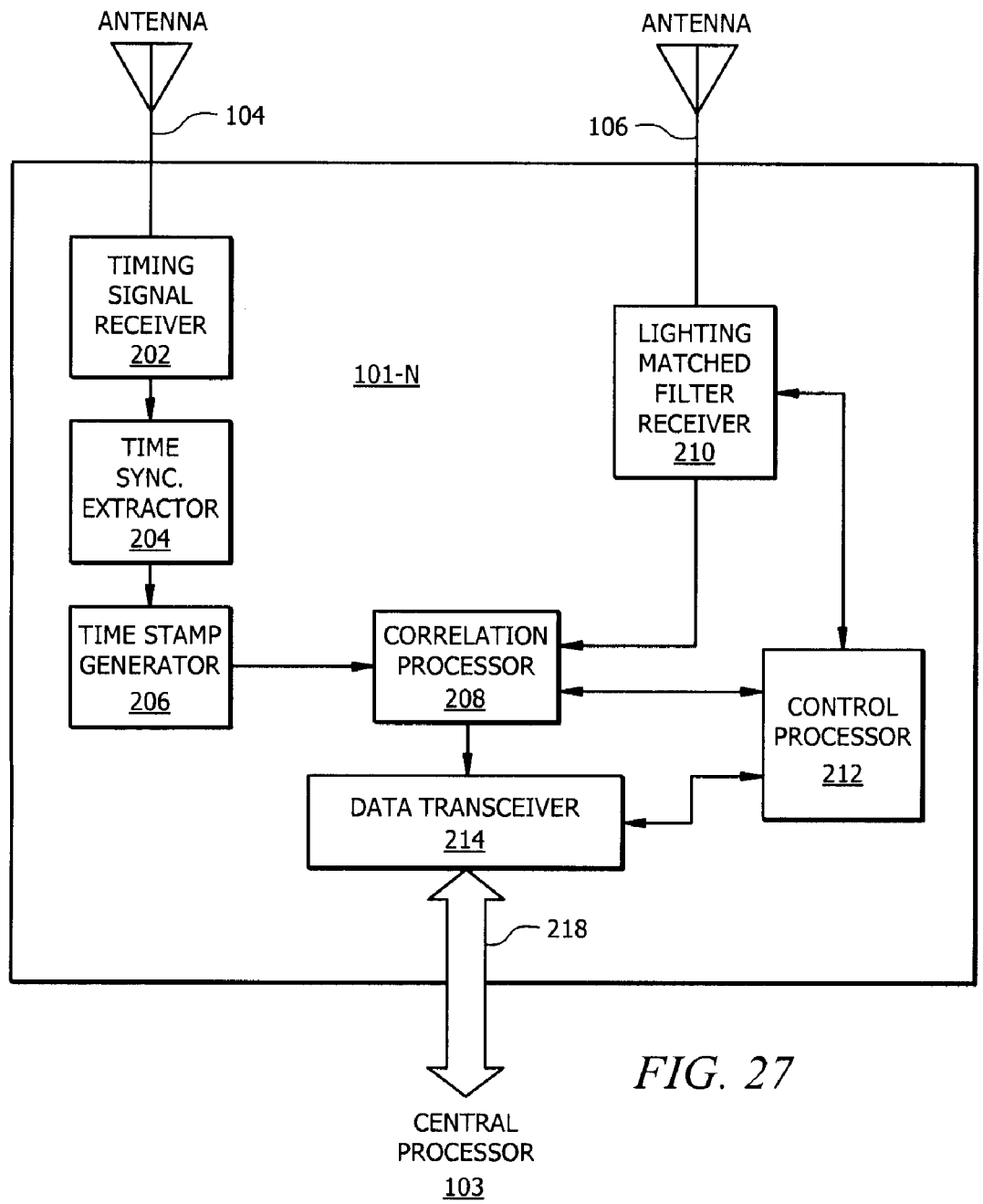
FIG. 27 is a detailed block diagram of a monitoring station that can be used in the present invention.

Referring to FIG. 1, there is shown a block diagram which conceptually illustrates the operation of a time difference of arrival (TDOA) type system 100 for locating a source of an electromagnetic signal having a particular wave form. The system includes three or more monitoring stations 101-1, 101-2, 101-N positioned at different spaced apart geographic locations. In FIG. 1 only three monitoring stations are shown for convenience. However, it should be understood that three or four monitoring stations are normally used for TDOA type systems. Referring to FIG. 27 each monitoring station 101-1, 101-2, 101-N comprises a lightning matched filter radio receiver 210 capable of receiving electromagnetic energy generated by an RF source which is to be located by the system 100. A receiving antenna 106 is provided at each monitoring station 101-1, 101-2, 101-N for receiving the electromagnetic energy generated by the RF source.

Each monitoring station 101-1, 101-2, 101-N can also comprise a time synchronization system which is used to synchronize a timing generator at each monitoring station. The time synchronization system can include a radio receiver 202 coupled to a timing signal antenna 104 for receiving a time synchronization signal. For example, a GPS timing signal can be received by timing signal antenna 104 for this purpose.

At each monitoring station 101-1, 101-2, 101-N there is located the lightning matched filter receiver 210 with a bank of filters matched to nominal but arbitrary lightning waveforms. The frequency response function of the matched filters are selected so that it corresponds to the characteristics of waveforms normally associated with the RF source to be located. According to one embodiment of the invention, the frequency response of the matched filters is selected to have an impulse response that is the image of the received waveform produced by natural phenomena such as lightning.

If the bandwidth of the receiver pass band is wide compared with that occupied by the signal energy, extraneous noise will be introduced by the excess bandwidth which can lower the output signal to noise ratio. On the other hand, if the receiver bandwidth is narrower than the bandwidth occupied by the signal, the noise energy can be reduced along with a considerable part of the signal energy. The net result will again be a lowered signal to noise ratio. Thus, there is an optimum bandwidth at which the signal to noise ratio is at a maximum. The network whose frequency response function maximizes the output peak signal to mean noise (power) ratio is called a matched filter.

Figure 2A:
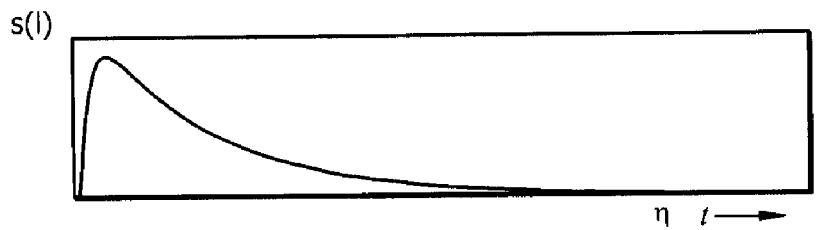
FIG. 2A shows the plot of a received waveform s(f) and FIG. 2B is the plot of the impulse response h(t) of a matched filter.
Figure 2B:
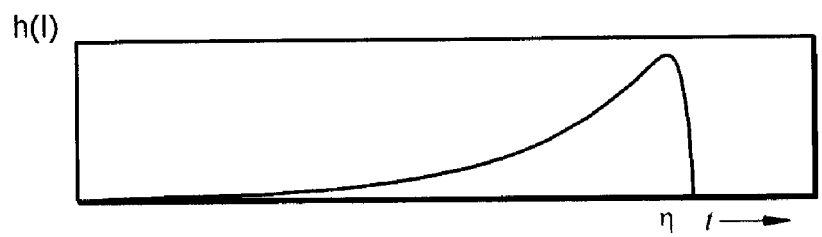

The frequency response function of a linear, time invariant filter which maximizes the output peak signal to mean noise (power) ratio for a fixed input signal to noise (energy) ratio can be obtained for a received waveform with a given ratio of signal energy to noise power (or noise power per hertz of bandwidth) where the noise that accompanies the signal is assumed to be stationary and has a uniform spectrum (white noise). It need not be Gaussian. The filter may also be specified by its impulse response, which is the inverse Fourier transform of the frequency response function. Physically, the impulse response is the output of the filter as a function of time when the input is an impulse (delta function). By combining the frequency response function of the filter with the impulse response, there is obtained a matched filter having an impulse response which is the image of the received waveform. It is the same as the received signal run backward in time starting from the fixed time t1. This is shown in FIGS. 2A, and 2B where FIG. 2A is a plot of a received waveform s(f), and FIG. 2B is a plot of the impulse response h(t) of the matched filter.

The output of the matched filter is not a replica of the input signal. However, for detecting signals in noise, it is not important to preserve the shape of the signal. The output of the matched filter is proportional to the input signal cross correlated with a replica of the transmitted signal. Thus, the matched filter forms the cross correlation between the received signal corrupted with noise and a replica of the transmitted signal. The replica of the transmitted signal is built into the matched filter via the frequency response function. If the input signal is the same as the signal for which the matched filter is designed, the output will be the autocorrelation function.

No matter what the shape of the input signal waveform, the maximum ratio of the peak signal power to the mean noise power is twice the energy contained in the signal divided by the noise power per hertz of bandwidth. The noise power per hertz of bandwidth is equal to Boltzmann's constant, times the standard temperature of 290K, times the receiver noise figure.

In the matched filter referred to above, the spectrum of the noise accompanying the signal is assumed to be white. That is, it is independent of frequency. When the noise is non-white, the filter which maximizes the output signal to noise ratio is called a non-white noise (NWN) matched filter. With white noise, the NWN matched filter frequency response function is that of the matched filter described above. Thus, the NWN matched filter can be considered as being the cascade of two filters. The first filter having a frequency response function which makes the noise spectrum uniform or white, and sometimes referred to as a whitening filter. The second filter is the matched filter as described above when the input is white noise and a signal whose spectrum is S(f) divided by Ni(f); where S(f) is the voltage spectrum (Fourier transform) of the input signal; and Ni(f) is the input noise spectrum.

According to an embodiment of the invention, the response of the lightning matched filter receiver is selected to have a frequency response that conforms to a waveform produced by natural phenomena. For example, the lightning matched filter receiver can be configured to identify cloud-to-ground lightning strikes. In this instance, the lightning matched filter receiver is designed to have a response function which corresponds to an impulse produced by cloud-to-ground lightning.

According to an embodiment, the lightning matched filter receiver can be designed to detect specific types of lighting strikes. For example, the lightning matched filter receiver can be configured to detect RF signals known to be associated with cloud-to-ground lightning, cloud-to-cloud lighting, or other types of lightning.

Figure 3:
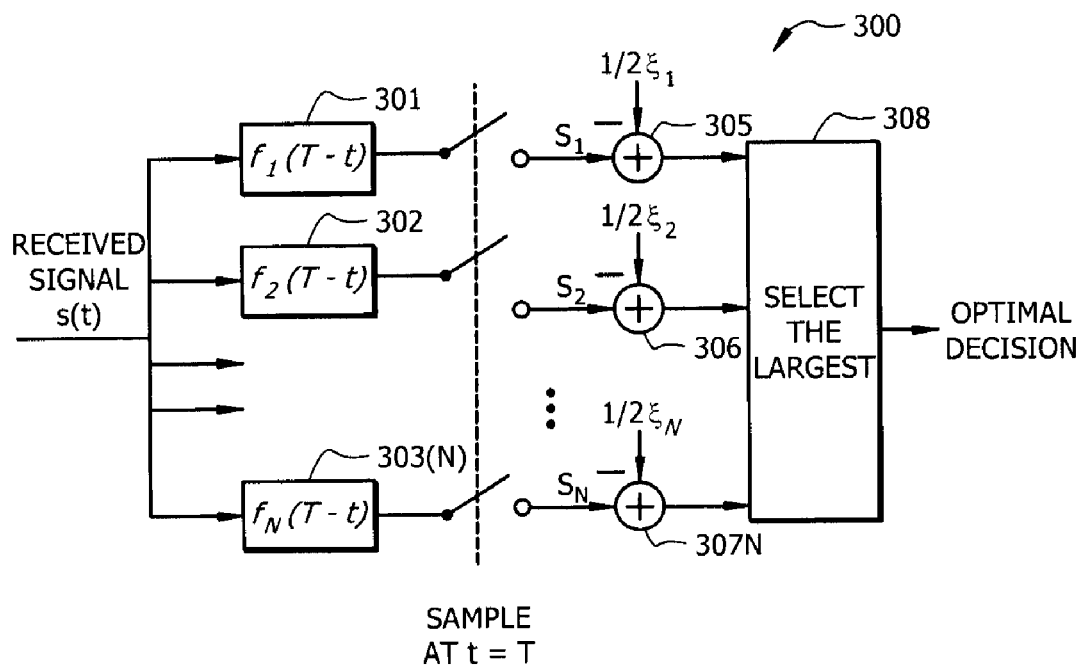
FIG. 3 is a block diagram of a matched filter receiver.

Referring to FIG. 3, there is shown a matched filter receiver architecture 300. The matched filter receiver passes the received signal s(t) through a bank of filters 301, 302, . . . 303(N) matched to the possible received signals Sn. The output of the N matched filters are sampled during the interval T, and adjusted for the bias at 305, 306, 307N in the case of unequal signal energies. The signal Sn with the largest correlation is selected by the circuit 308 from the set of N possible received signals. Use of matched filter receiver architectures is known in the art for use in connection with decoding of digital data symbols.

Figure 4:
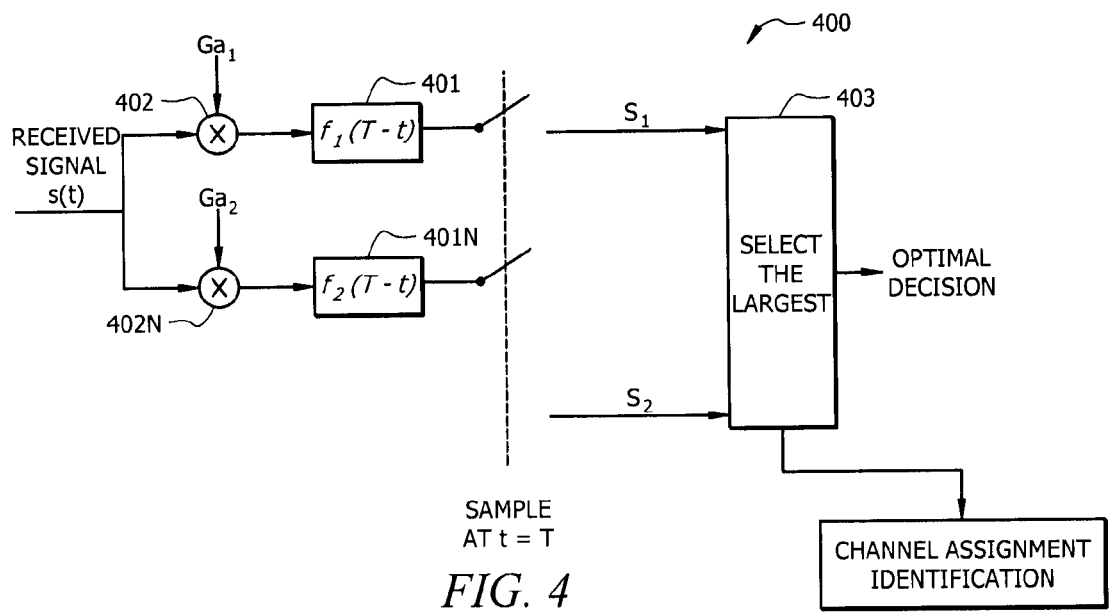
FIG. 4 is a block diagram of a lightning matched filter receiver in accordance with the principles of the invention.

Referring to FIG. 4, there is disclosed a matched filter receiver 400 for detecting lightning in accordance with the principles of the invention. The lightning matched filter receiver 400 passes the received signal s(t) through a bank of filters 401-401N which are matched to nominal but arbitrary waveforms which represent the possible received lightning waveform types Sn. The lightning matched filter receiver in this example has two channels, one to detect cloud to ground discharges (401-1) and one to detect cloud to cloud discharges (4-01-N). However, it should be understood that the number of filters and associated channels can be expanded to further classify lightning events. For example, such additional types of lightning events can include without limitation near lightning events, distant lightning of inter-cloud discharges, and intra-cloud discharges.

Since different types of lightning are known to produce signals having different signal energies, it is advantageous to equalize such signal energies to facilitate signal classification. For example, in the example shown in FIG. 4, it is known that cloud to ground (CG) strikes and cloud to cloud (IC) strokes have unequal signal energies. Accordingly, in order to facilitate signal classification, it is advantageous for the received signal S(t) to be adjusted or scaled in accordance with the filter gain bias Ga 402, 402N. The input signal is then passed through the two matched filters 401, 401N. The outputs of the matched filters are sampled during a sample interval T. Based on such sampling, a channel assignment decision is made in which the signal Sn with the largest correlation is selected by the circuit 403 from the two possible received signals.

The channel assignment decision is a determination of the lightning type, e.g. CG or IC in this example. The largest correlation is determined by comparing the peak output value of each filter 401, 401N, and selecting the channel for which the filter output value is larger. If the largest correlation occurs on the channel containing a matched filter for CG type lightning, then the lightning is classified as CG and the output from that channel is passed to the next processing stage. Conversely, if the largest correlation occurs for the channel containing a matched filter for IC type lightning, then the lightning is classified as IC and the type lightning, and the output from that channel is passed to the next processing stage. Since IC strokes usually have a shorter duration than CG strokes, multiple correlations may be detected during a sample interval T.

The output signal from filters 401, 401N having the largest correlation value is communicated by circuit 403 to the next processing block. Circuit 403 can also advantageously generate an output signal to identify a channel assignment identification data. The channel assignment identification data specifies or identifies the channel determined by circuit 403 to have the largest correlation. This information can be communicated to a subsequent processing block. Further processing of the output signals from circuit 403 will be discussed in more detail in relation to FIG. 27.

Once the channel assignment decision by circuit 403 is made for each peak in the sample period, the time of arrival, polarity, amplitude, rise time, and peak to zero time are determined for each peak. Then, the lightning events are grouped together and sent over a communications link for location processing by a central processor. These additional processing steps are also described in more detail in relation to FIG. 27.

Cloud to Ground Matched Filter.

Figure 5:
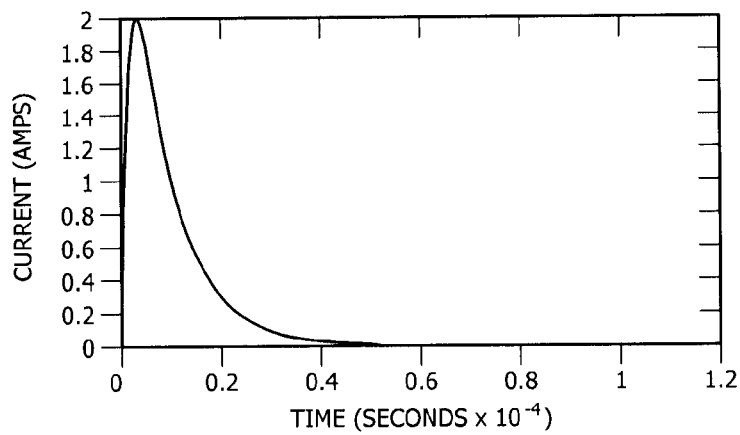
FIG. 5 is a plot of the CG matched filter impulse response, h(t)

Ninety percent of CG lightning is downward negative lightning. This suggests that the impulse response of the filter matched to CG lightning should use the nominal parameters of downward negative lightning. The return stroke duration range that includes both first and subsequent strokes is substantially 30 to 80 usec. The return stroke rise time range that includes both first and subsequent strokes is substantially 0.3 to 5 usec. The return stroke peak current amplitude range that includes both first and subsequent strokes is substantially 10 to 30 kAmps. The nominal values for a CG matched filter impulse response are substantially a 3 usec rise time, a 55 usec duration, and a 20 kAmp peak amplitude. FIG. 5, which is a plot of CG matched filter impulse response h(t), represents the CG impulse response, h(t), using the nominal parameters.

Cloud to Cloud Matched Filter

Figure 6:
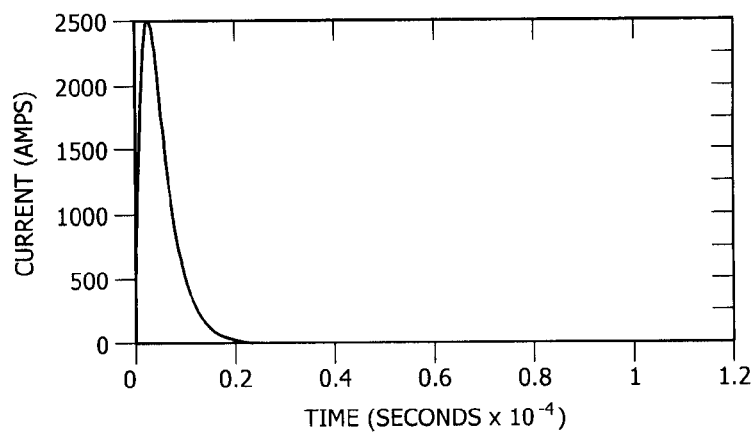
FIG. 6 is a plot of the IC matched filter impulse response, h(t)
Figure 7A:
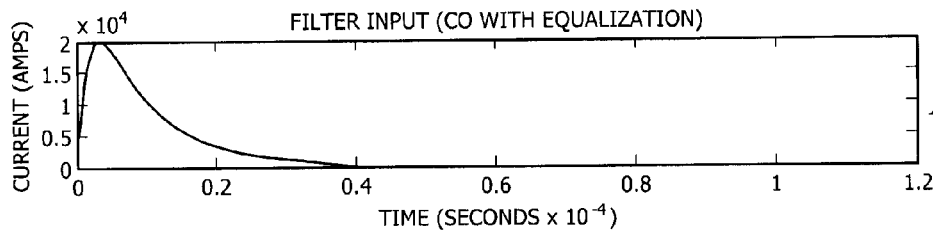
FIGS. 7A, 7B, and 7C are plots of CG filter input, ground stroke filter output, and cloud stroke filter output, respectively with no channel equalization.
Figure 7B:
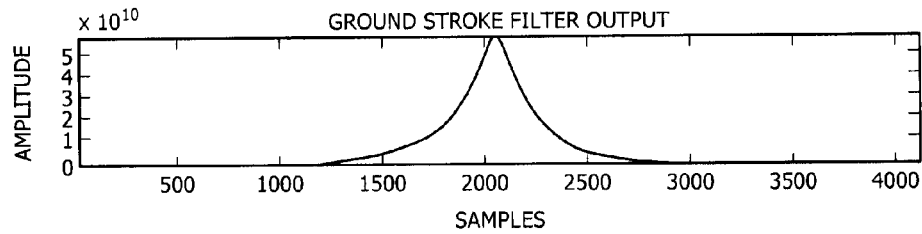
Figure 7C:
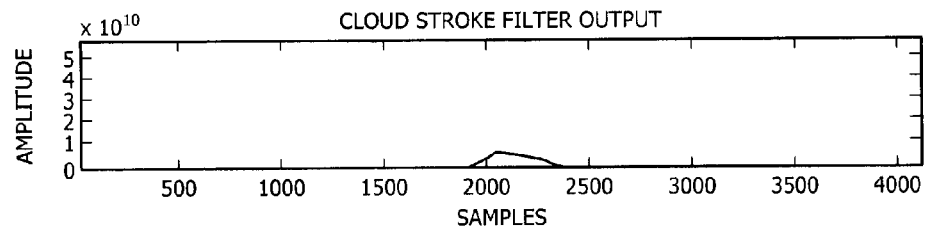
Figure 8A:
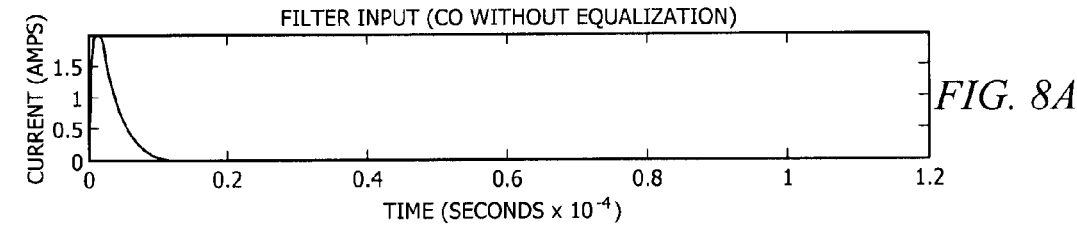
FIGS. 8A, 8B, and 8C are plots of IC filter input, ground stroke filter output, and cloud stroke filter output, respectively with no channel equalization.
Figure 8B:
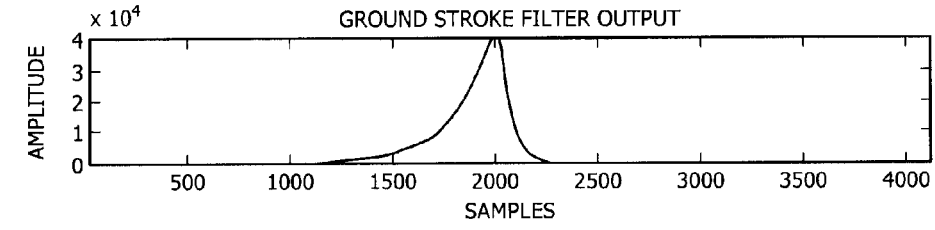
Figure 8C:
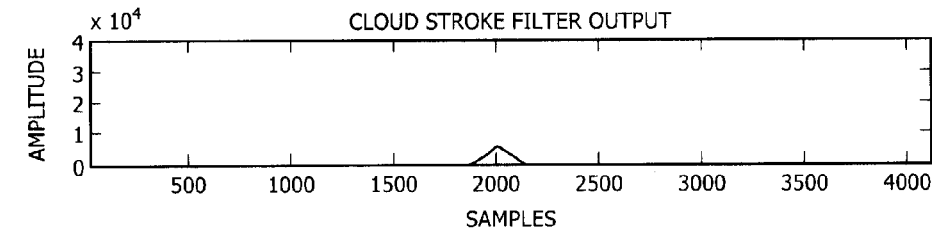

The cloud pulse half cycle duration range is substantially 5 to 25 usec. The cloud stroke rise time is in the range of 1.5 to 3.1 usec. The cloud stroke peak current amplitude range is from less than 1 kAmp to 5 kAmps. The nominal values for an IC matched filter impulse response are, substantially, a 2 usec. rise time, a 15 usec. duration, and a 2.5 kAmp peak amplitude. FIG. 6 is a plot of the IC matched filter impulse response h(t), and represents the IC impulse response h(t), using the nominal parameters. The double exponential lightning waveform equation was used to generate the impulse response with these parameters.

Channel Equalization

Since different types of lightning can produce waveforms having unequal signal energies, the channel gain should be adjusted before the two channels are compared. Referring to FIGS. 7A-C and 8A-C, there are shown plots of CG and IC filter inputs, ground stroke filter outputs, and cloud stroke filter outputs, respectively, when no channel equalization is present.

Figure 9A:
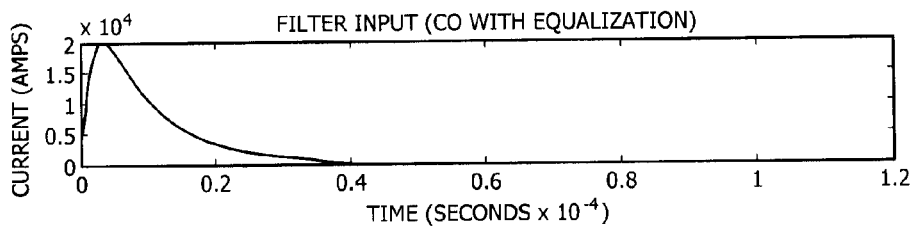
FIGS. 9A, 9B, and 9C are plots of CG filter input, ground stroke filter output, and cloud stroke filter output, respectively with channel equalization.
Figure 9B:
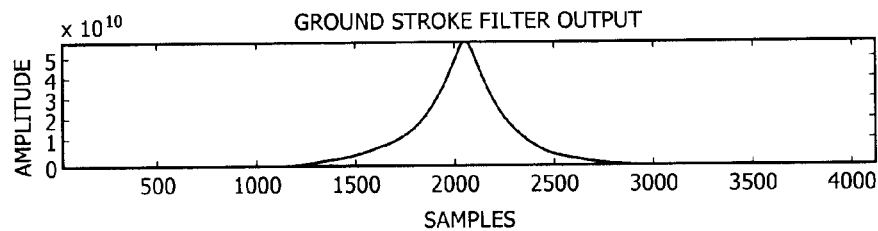
Figure 9C:
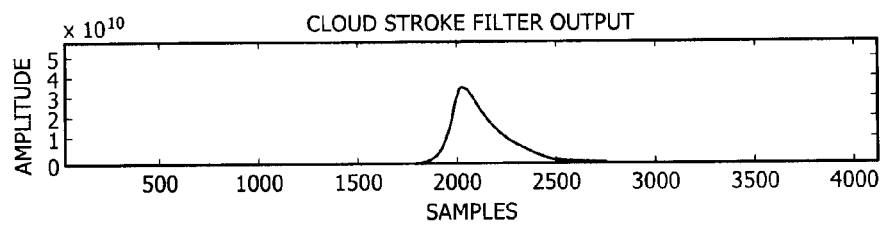
Figure 10A:
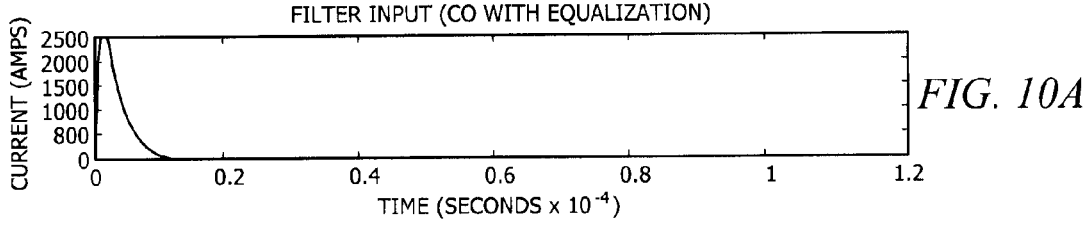
FIGS. 10A, 10B, and 10C are plots of IC filter input, ground stroke filter output, and cloud stroke filter output, respectively with channel equalization.
Figure 10B:
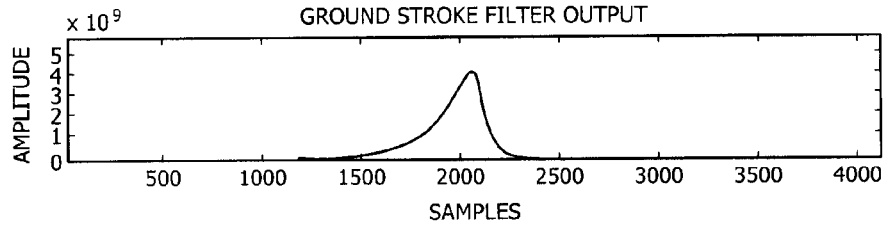
Figure 10C:
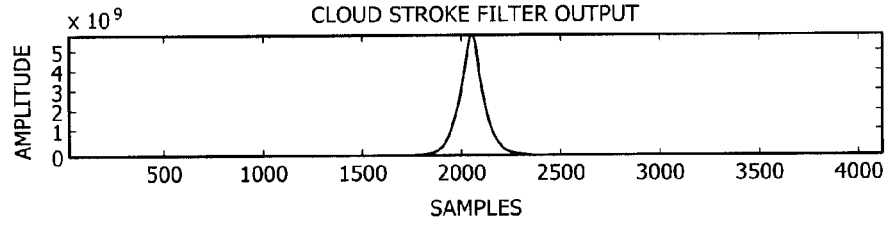
Figure 11A:
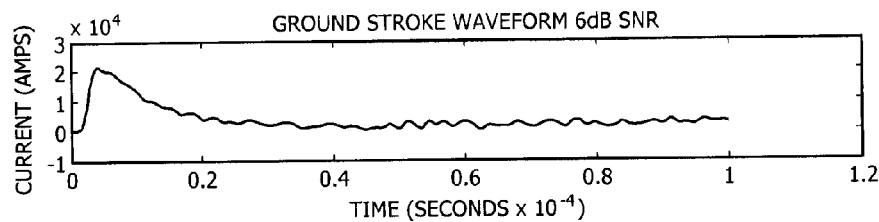
FIGS. 11A, 11B, and 11C are plots of the input, ground stroke output, and cloud stroke output, respectively, for the lightning matched filter receiver with an ideal CG waveform with 6 dB SNR.
Figure 11B:
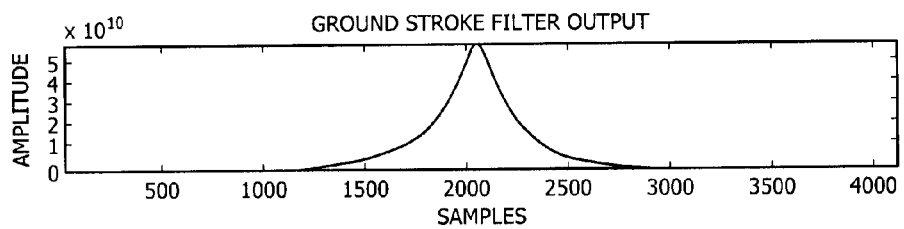
Figure 11C:
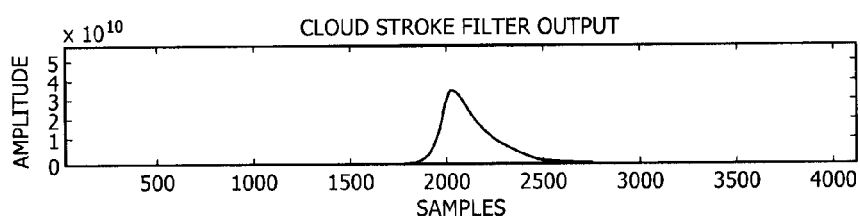
Figure 12A:
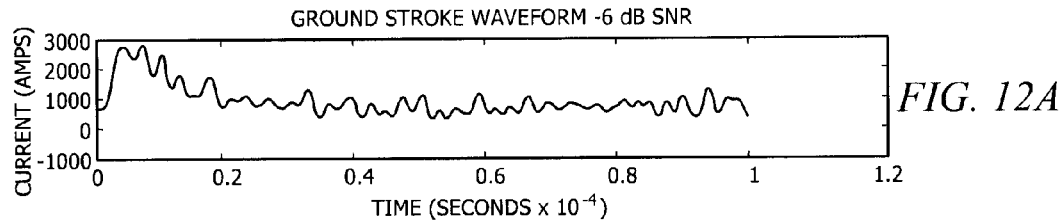
FIGS. 12A, 12B, and 12C are plots of the input, ground stroke output, and cloud stroke output, respectively, for the lightning matched filter receiver with an ideal CG waveform with −6 dB SNR.
Figure 12B:
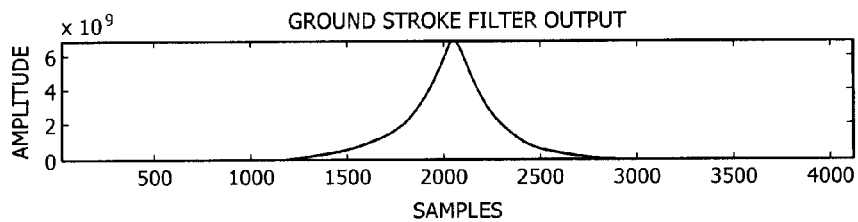
Figure 12C:
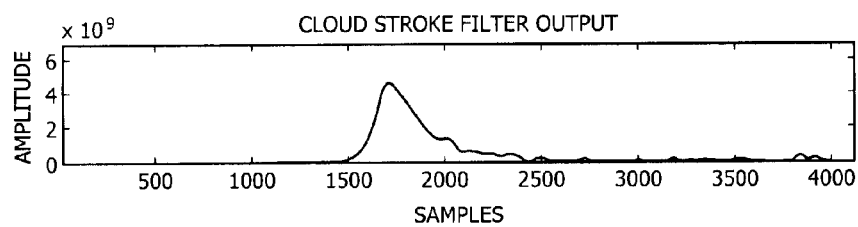
Figure 13A:
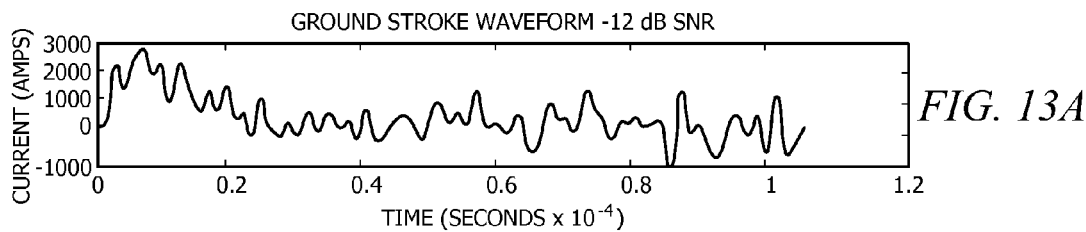
FIGS. 13A, 13B, and 13C are plots of the input, ground stroke output, and cloud stroke output, respectively, for the lightning matched filter receiver with an ideal CG waveform with −12 dB SNR.
Figure 13B:
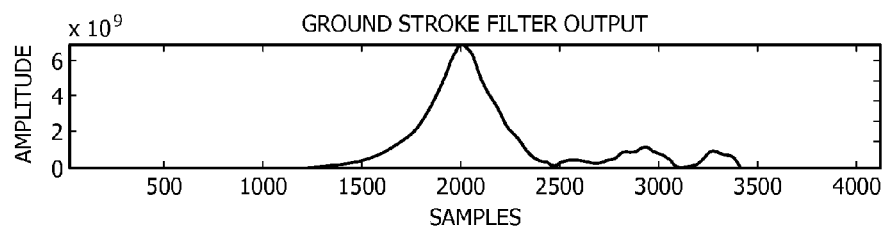
Figure 13C:
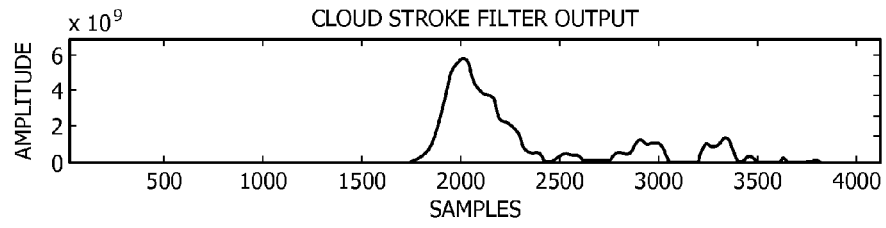
Figure 14A:
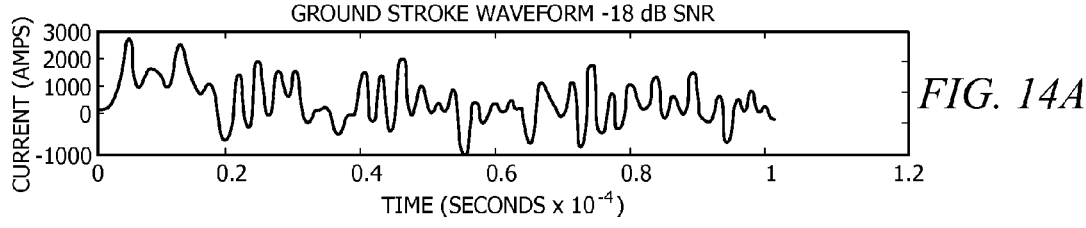
FIGS. 14A, 14B, and 14C are plots of the input, ground stroke output, and cloud stroke output, respectively, for the lightning matched filter receiver with an ideal CG waveform with −18 dB SNR.
Figure 14B:
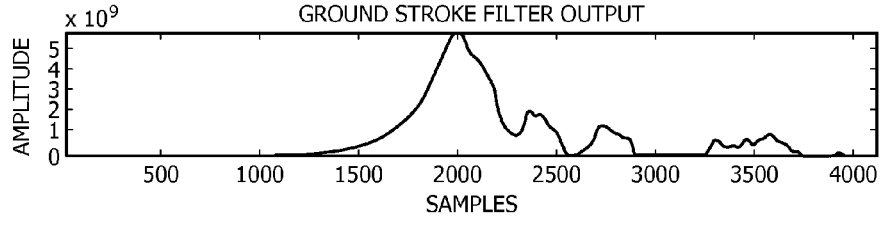
Figure 14C:
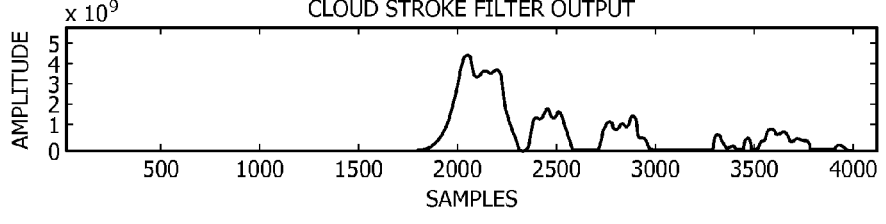
Figure 15A:
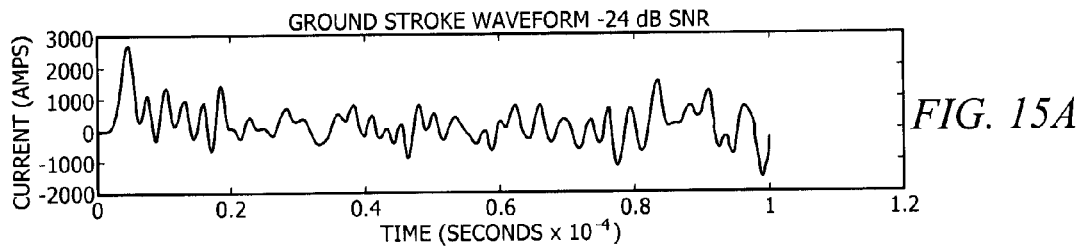
FIGS. 15A, 15B, and 15C are plots of the input, ground stroke output, and cloud stroke output, respectively, for the lightning matched filter receiver with an ideal CG waveform with −24 dB SNR.
Figure 15B:
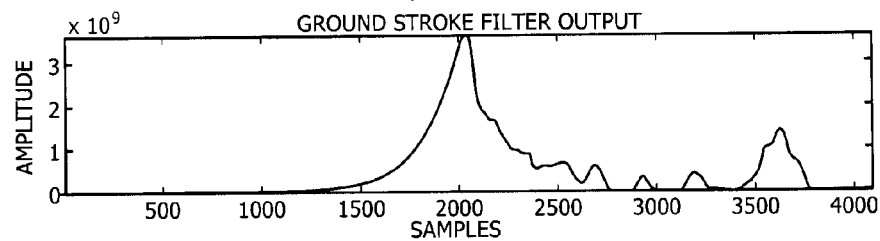
Figure 15C:
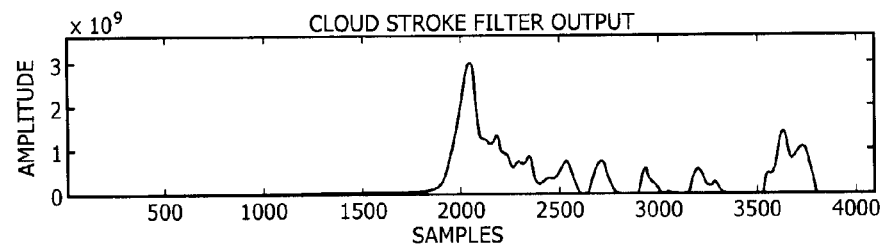
Figure 16A:
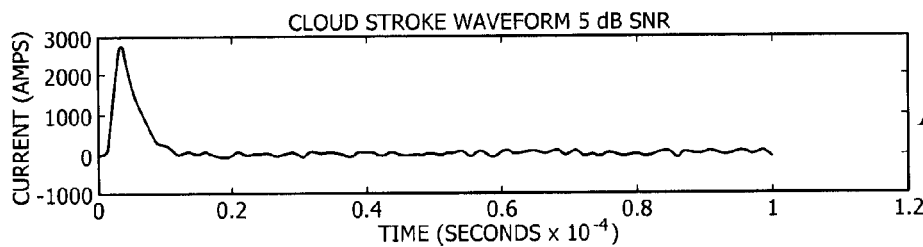
FIGS. 16A, 16B, and 16C are plots of the input, ground stroke output, and cloud stroke output, respectively, for the lightning matched filter receiver with an ideal IC waveform with 6 dB SNR.
Figure 16B:
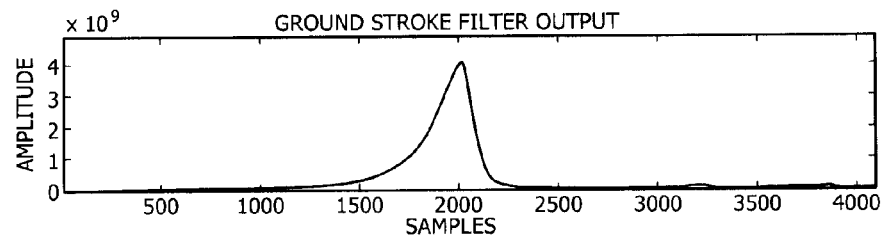
Figure 16C:
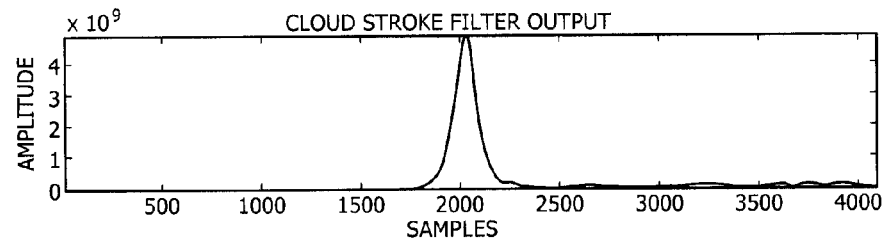
Figure 17A:
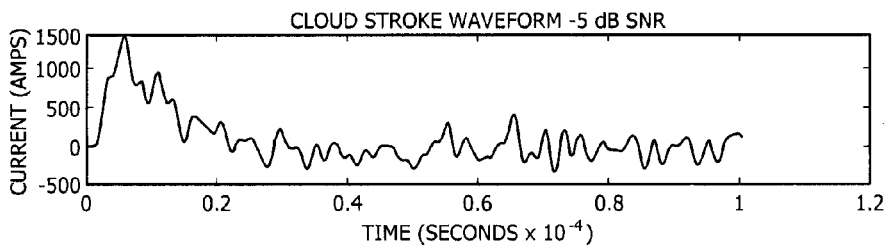
FIGS. 17A, 17B, and 17C are plots of the input, ground stroke output, and cloud stroke output, respectively, for the lightning matched filter receiver with an ideal IC waveform with −6 dB SNR.
Figure 17B:
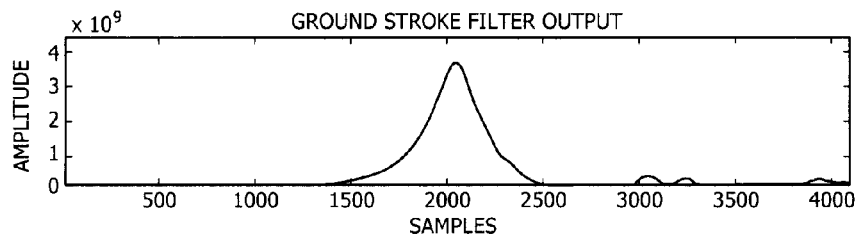
Figure 17C:
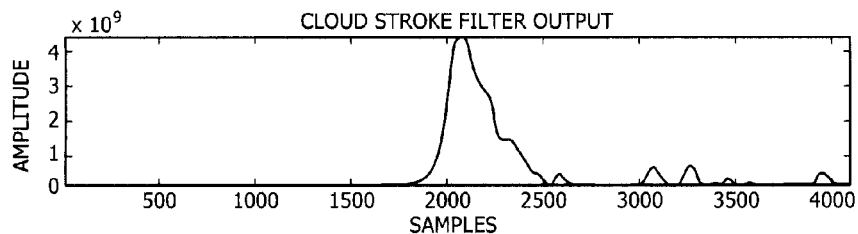
Figure 18A:
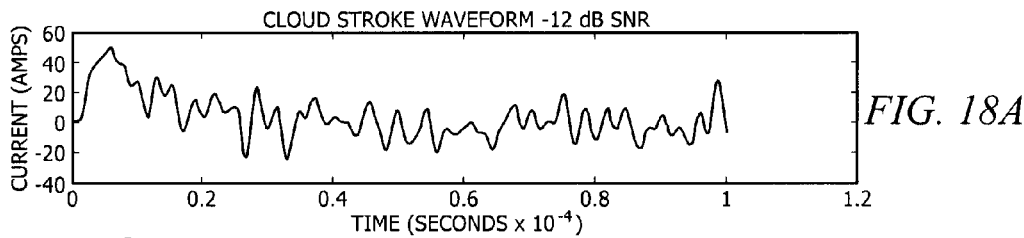
FIGS. 18A, 18B, and 18C are plots of the input, ground stroke output, and cloud stroke output, respectively, for the lightning filter receiver with an ideal IC waveform with −12 dB SNR.
Figure 18B:
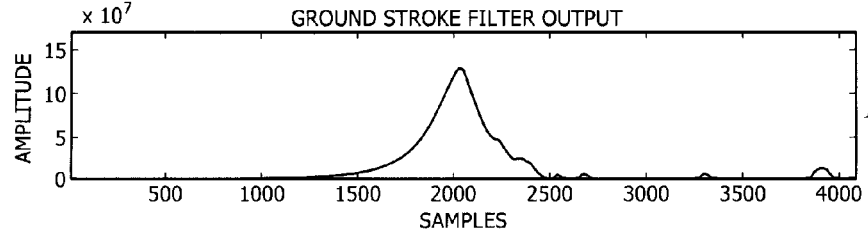
Figure 18C:
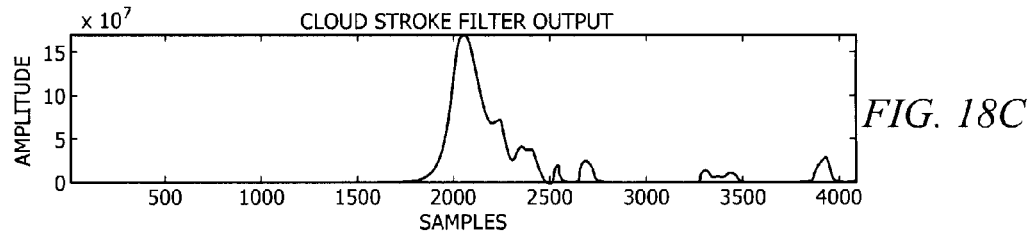
Figure 19A:
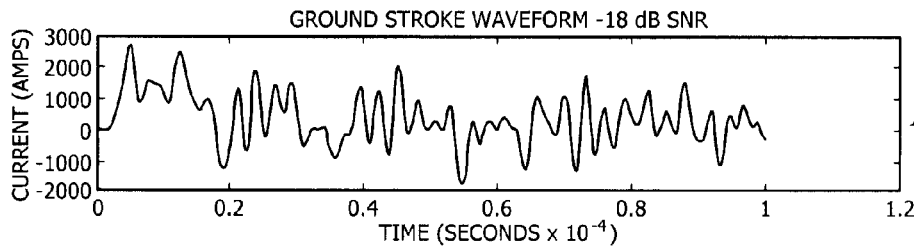
FIGS. 19A, 19B, and 19C are plots of the input, ground stroke output, and cloud stroke output, respectively, for the lightning matched filter receiver with an ideal IC waveform with −18 dB SNR.
Figure 19B:
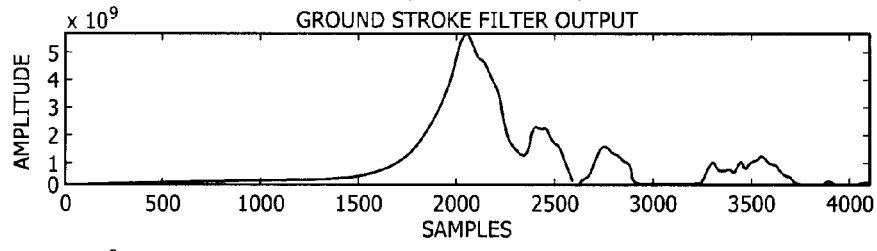
Figure 19C:
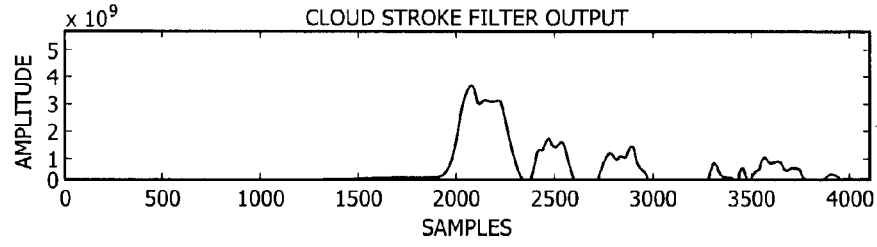
Figure 20A:
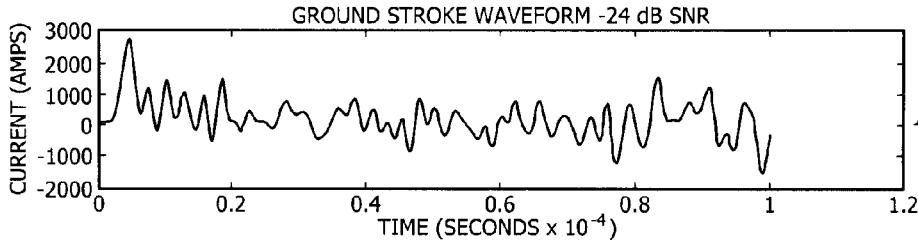
FIGS. 20A, 20B, and 20C are plots of the input, ground stroke output, and cloud stroke output, respectively, for the lightning matched filter receiver with an ideal IC waveform with −24 dB SNR.
Figure 20B:
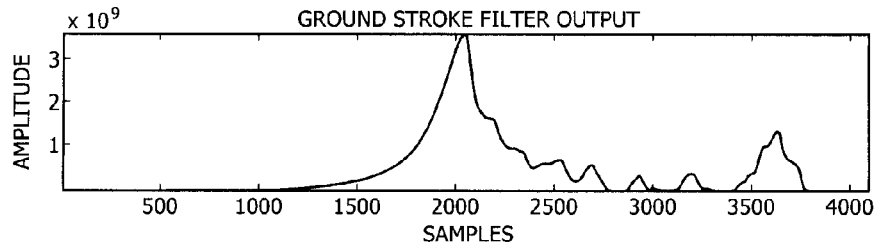
Figure 20C:
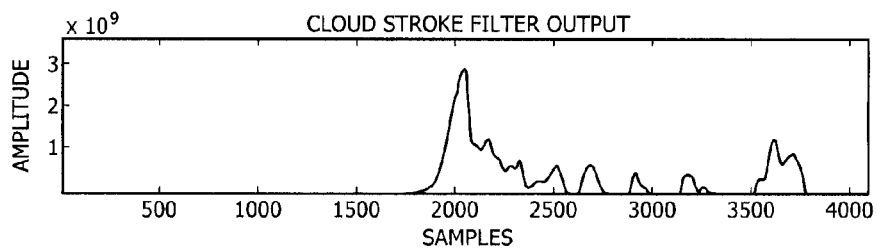

The ratio of the energy between the CG and IC filter impulse responses is used to multiply the IC filter gain to equalize the channel outputs. The energy of the filter impulse response is the sum of the squares of the individual samples of each filter impulse response. FIGS. 9A-C show plots of CG filter input, ground stroke filter output, and cloud stroke filter output, respectively with channel equalization; and FIGS.

10A-C show plots of IC filter input, ground stroke filter output, and cloud stroke filter output, respectively when channel equalization is present.

Ideal Operation

Ideal performance is defined as the autocorrelation of the CG and IC impulse response waveforms. The ideal waveforms are combined with band limited additive white Gaussian noise at various signal to noise levels. The noisy signals are then passed through matched filters to obtain the matched filter output at the different noise levels. FIGS. 11A-C through 15A-C are plots of the input, ground stroke output, and cloud stroke output, respectively, for the lightning matched filter receiver with an ideal CG waveform with various levels of SNR. FIGS. 16A-C through FIGS. 20A-C are plots of the input, ground stroke output, and cloud stroke output, respectively, for the lightning matched filter receiver with an ideal IC waveform with different levels of SNR.

Actual Performance

Figure 21:
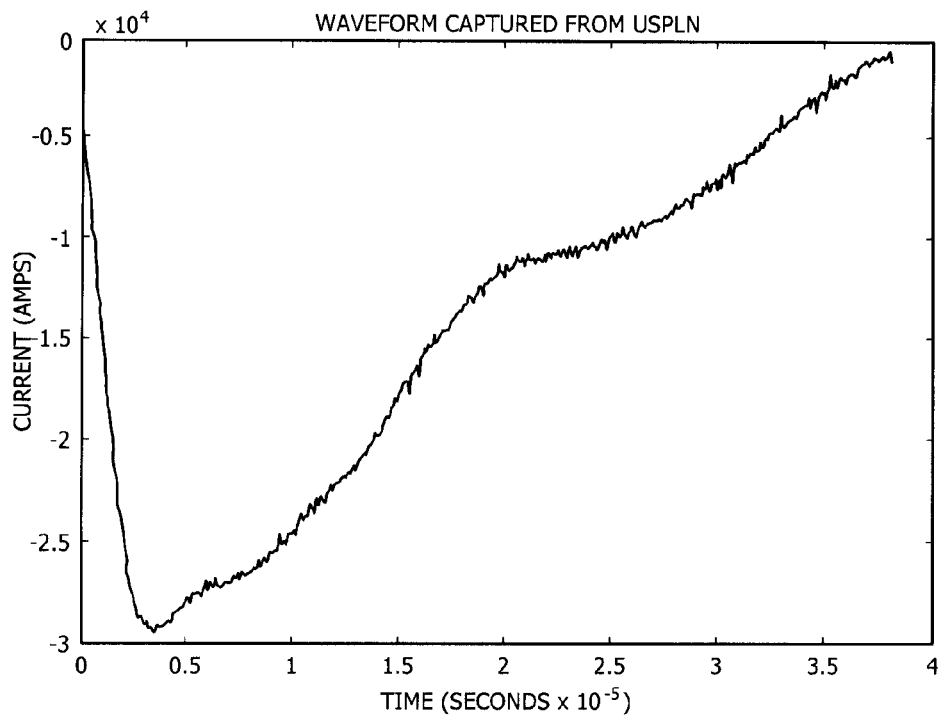
FIG. 21 is a plot of a negative CG waveform.
Figure 22A:
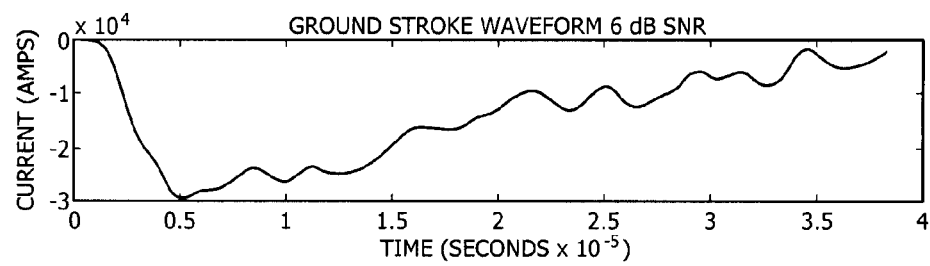
FIGS. 22A, 22B, and 22C are plots of the input, ground stroke output, and cloud stroke output, respectively, for the lightning matched filter receiver with the waveform of FIG. 21 with 6 dB SNR.
Figure 22B:
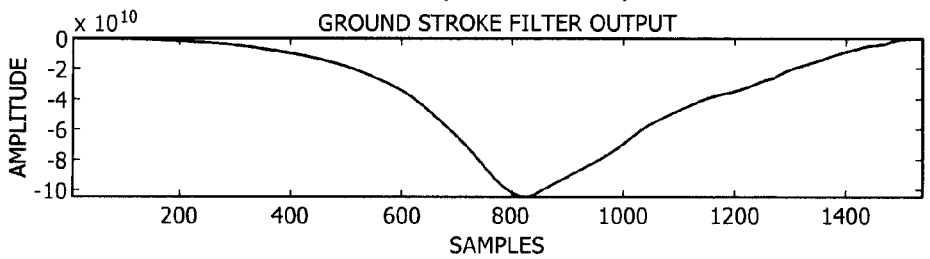
Figure 22C:
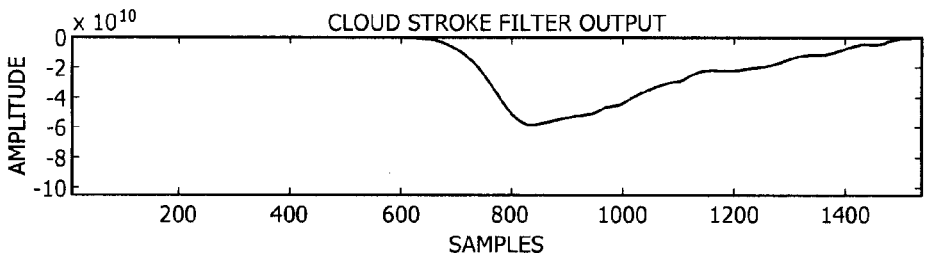
Figure 23A:
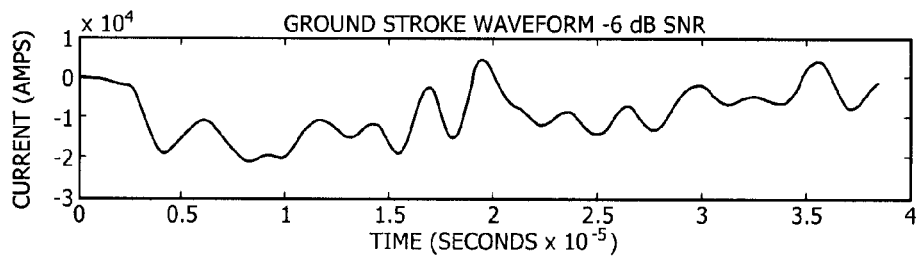
FIGS. 23A, 23B, and 23C are plots of the input, ground stroke output, and cloud stroke output, respectively, for the lightning matched filter receiver with the waveform of FIG. 21 with −6 dB SNR.
Figure 23B:
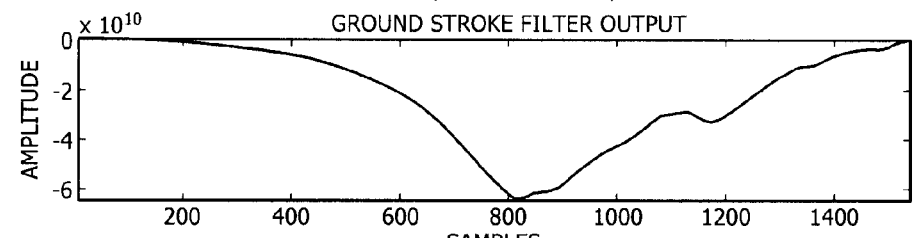
Figure 23C:
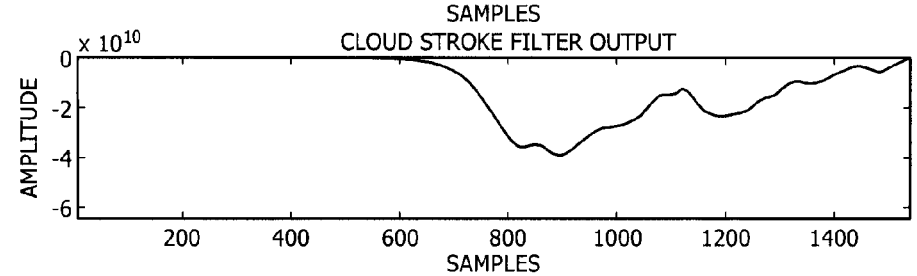
Figure 24A:
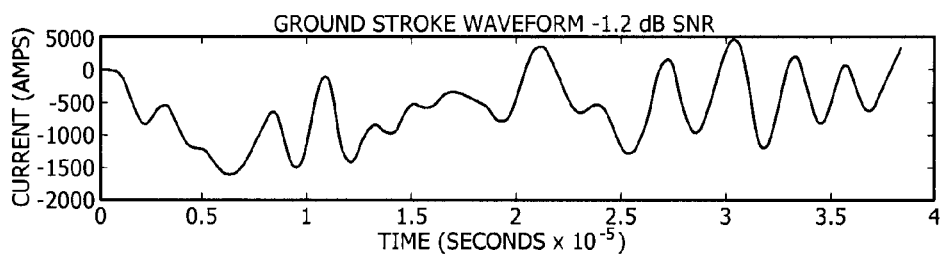
FIGS. 24A, 24B, and 24C are plots of the input, ground stroke output, and cloud stroke output, respectively, for the lightning matched filter receiver with the waveform of FIG. 21 with −12 dB SNR.
Figure 24B:
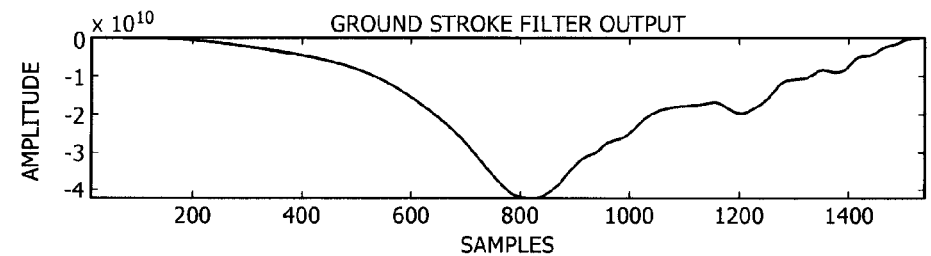
Figure 24C:
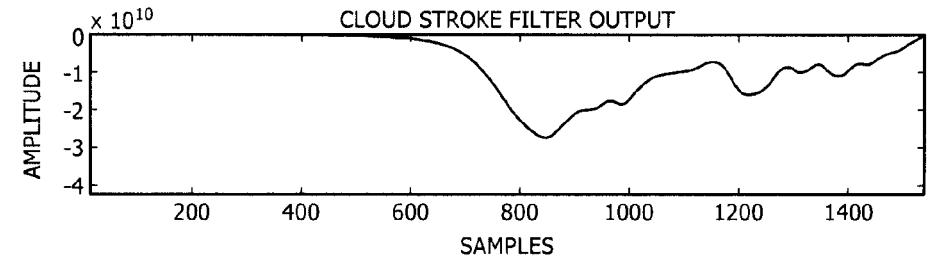
Figure 25A:
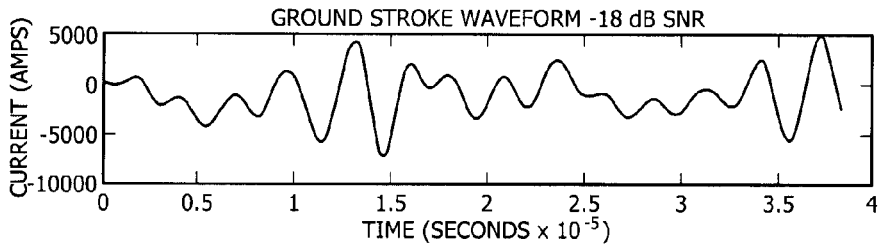
FIGS. 25A, 25B, and 25C are plots of the input, ground stroke output, and cloud stroke output, respectively, for the lightning matched filter receiver with the waveform of FIG. 21 with −18 dB SNR.
Figure 25B:
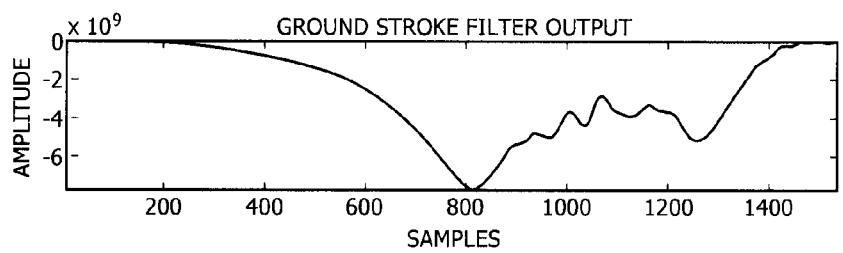
Figure 25C:
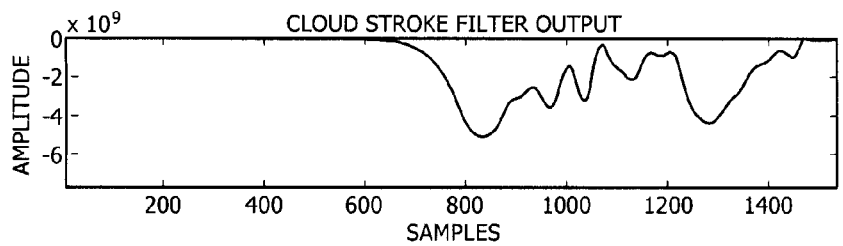
Figure 26A:
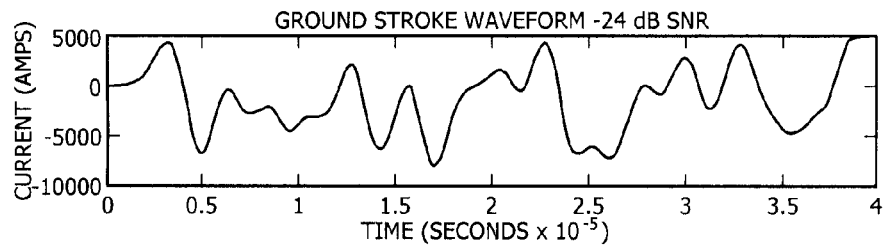
FIGS. 26A, 26B, and 26C are plots of the input, ground stroke output, and cloud stroke output, respectively, for the lightning matched filter receiver with the waveform of FIG. 21 with −24 dB SNR.
Figure 26B:
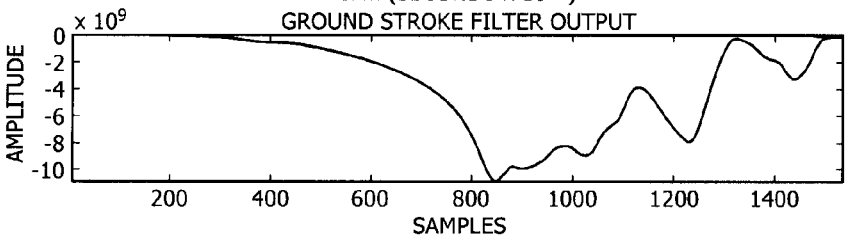
Figure 26C:
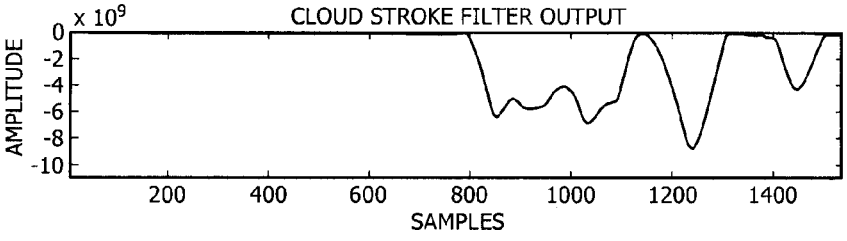

Following are plots showing the performance the lightning matched filter receiver here disclose under actual conditions using an actual waveform captured from the United States Precision Lightning Network (USPLN). The captured waveform was combined with band limited additive white Gaussian noise at various signal to noise levels. The noisy signal was then passed through the matched filters to obtain the matched filter output at different noise levels. Referring to FIG. 21, there is shown the unaltered waveform captured from a receiver of the USPLN system of a negative ground stroke that was 181 km from the receiver. FIGS. 22A-C through 26A-C show the performance of the lightning matched filter receiver of this invention with plots of the input, ground stroke output, and cloud stroke output, respectively, for the lightning matched filter receiver with the waveform of FIG. 21 with different levels of SNR.

Waveforms associated with various types of lightning will vary somewhat from one lightning strike to the next. In this regard, it is to be understood that the frequency response function of the lightning matched filter receiver here disclosed will not necessarily be identical to the actual waveform produced in any particular strike. Instead, the frequency response of the lightning matched filter receiver will have a frequency response which approximates a typical waveform of the type that the system is designed to identify. In this regard, the frequency response of the lightning matched filter receiver can be modeled based on a number of actual examples of a particular known type of lightning strike using averaging or other mathematical techniques for obtaining a set of samples.

Timing synchronization of the signals at each monitoring station 101-1, 101-2, 101-N can be obtained by using a GPS timing signal. Thereafter, the signals are used for determining the location of the detected stroke.

From the above, it should be noted that the output signal-to-noise ratio $SNR_0$ will be greater in all cases than a corresponding signal-to-noise ratio that could be achieved with other processes using three received signals with the same signal-to-noise ratio. This is an important advantage. In fact, if the signal received by monitoring stations 101-1, 101-2, 101-N is corrupted with additive white Gaussian noise, the lightning matched filter receiver which is disclosed here will have the effect of maximizing the signal to noise ratio.

Referring now to FIG. 27, there is shown a more detailed block diagram of a monitoring station 101-N. Each of the three or more monitoring stations 101-1, 101-2, 101-N used in system 100 can advantageously have a configuration similar to that shown in FIG. 27. Monitoring station 101-N can be comprised of timing signal antenna 104 coupled to a timing synchronization subsystem. The time synchronization subsystem includes a timing synchronization receiver 202 coupled to the timing signal antenna 104. If the system 100 uses GPS signals as a timing reference, then the timing signal antenna 104 and the timing signal receiver are preferably configured for receiving and processing GPS signals from a plurality of earth orbiting satellites. The invention is not limited in this regard and other types of timing signals can also be used without limitation. A time synchronization extractor 204 is provided for extracting timing information from the timing signal. This timing information can thereafter be used in a time stamp generator 206 to generate a digital time stamp value.

The time stamp generator 206 can be configured in various ways, depending upon the particular arrangement of the central processor 103. For example, in one embodiment, the time stamp value can be an actual time value defined by a timing signal, which can be used to specify a particular time when a particular electromagnetic event, such as lightning, has been detected. Alternatively, the time stamp generator can produce a timing offset value, which specifies a timing offset relative to an occurrence of a timing signal. Either type of time information can be used by a central processor 103 for purposes of determining a location of a lightning occurrence. Various systems and algorithms for determining a location of lightning are well known in the art. Accordingly, such systems will not be described here in detail. Time stamp value produced by time stamp generator 206 is periodically communicated to the correlation processor 208.

Monitoring station 101 also includes the lightning matched filter receiver 210. The lightning matched filter receiver 210 has an architecture which includes a matched filter receiver similar to the arrangement previously described with respect to FIG. 4. Consequently, the lightning matched filter processes electromagnetic signals caused by lightning and provides outputs as shown in FIGS. 5-26. The output of the lightning matched filter receiver 210 is fed to the correlation processor 208 where it is time stamped. Synchronization between the various components is provided by control processor 212.

During operation, the output signal from the lightning matched filter receiver 210 can be converted from an analog format to a digital format by means of a conventional analog to digital converter. For example, this A/D conversion step can be performed in circuit in 403 (FIG. 4), which can include an A/D converter (not shown). The resulting output signal will be a series of digital data samples that are communicated to the correlation processor 208.

The correlation processor 208 detects a peak in the output signal of the lightning matched filter receiver 210. It may be recalled from the discussion of FIG. 4, that if the input signal to a particular matched filter 401, 401N corresponds to the lightning signal type for which the matched filter is designed, then the output of that matched filter 401, 401N will be an autocorrelation function which can be best understood in relation to the exemplary results shown in FIGS. 7-26. As will be understood from these figures, the autocorrelation function in each case will generally have a peak. Such peaks can be observed in the output signals shown in FIGS. 7-26. Each output signal peak can be assigned a time (or a time offset) which corresponds to a time associated with a particular digital sample period. This peak time will differ from the peak time as measured at other monitoring stations 101-1, 101-2, 101-N as a result of a difference in the time of arrival of the electromagnetic energy at each such monitoring station 101-1, 101-2, 101-N.

In monitoring station 101-N, the digital data representing the value of a time stamp for a correlation function peak is communicated to data transceiver 214. The data transceiver 214 can include a modem coupled to a wired or wireless communication link 218 for communicating the digital data representing the time stamp value to the central processor 103.

As explained in relation to FIG. 4, circuit 403 generates channel assignment identification data. Such channel assignment identification data represents the classification of a signal as being associated with a particular type of lightning, e.g. CG or IC type lightning. This channel assignment identification data is advantageously provided to the data transceiver 214. This information can then be communicated to the central processor 103, together with the time stamp value.

The central processor 103 includes a computer processor and software configured to calculate the position of the source location using the time stamp information communicated from each of the three or more of monitoring stations 101, 102, 102N. The central processor 103 assembles the data from the various monitoring stations into groups representative of time-coincident events using a windowing technique. For example, time stamp data received from several monitoring stations within a 1 millisecond period could be grouped together under the assumption that all such data concerned a single lightning occurrence. Subsequently, a location is computed from the time stamps of each of the time-coincident events using a conventional time-difference-of-arrival algorithm. Most time-difference-of-arrival systems use a hyperbolic triangulation technique to determine the location.

Based on the time stamp data, the central processor 103 generates an output data which identifies a source location of a lightning occurrence. For example, such output data can be communicated to a computer database or displayed on a user interface display. Notably, the output data can also include an identification of a lightning type, such as IC or CG type. In particular, this output data can be generated based on the channel assignment identification information provided by circuit 403.

The signal processing and control functions associated with the present invention can be realized in one computer system. Alternatively, the present invention can be realized in several interconnected computer systems. Any kind of computer system or other apparatus adapted for carrying out the methods described herein is suited. A typical combination of hardware and software can be a radio receiving equipment, digital signal processing equipment, and/or a general-purpose computer system. The general-purpose computer system can have a computer program that can control the computer system such that it carries out the methods described herein.

The present invention can take the form of a computer program product on a computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

The invention described and claimed herein is not to be limited in scope by the embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A method for identifying a source location of lightning, comprising said steps of:
    positioning three or more monitoring stations at different spaced apart geographic locations, each said monitoring station including a matched filter receiver;
    responsive to a lightning occurrence, receiving a signal at each of said matched filter receivers from a common source of said lightning occurrence having a source location;
    in each said matched filter receiver, communicating said signal to a plurality of matched filters, each having a filter characteristic matched to a different one of a plurality of nominal but arbitrary lightning waveforms corresponding to a type of lightning occurrence;
    scaling a signal energy in a filter channel respectively provided for each of said matched filters to compensate for known predetermined unequal signal energy associated with each said type of lightning occurrence;
    generating at each said monitoring station a time stamp value and assigning said time stamp value to a peak output of one of said plurality of matched filters having a largest correlation value among a plurality of outputs of said plurality of matched filters;
    communicating said time stamp value assigned at each of said plurality of matched filter receivers to a central processor; and
    determining said source location based on said time stamp values.

2. The method according to claim 1, further comprising said step of selecting a frequency response function for each of said matched filters that respectively maximizes an output peak-signal-to-mean-noise ratio for each of said type of lightning occurrence.

3. The method according to claim 2, further comprising said step of selecting an impulse response function for each of said matched filters that is said image of said waveform respectively associated with each said type of lightning occurrence.

4. The method according to claim 3, wherein said image is said same as said receive signal run backward in time starting from a fixed time.

5. The method according to claim 1, further comprising generating in each of said matched filter receivers a channel assignment identification data specifying a lightning type based on a determination of which of said plurality of matched filters has said largest correlation value among a plurality of outputs of said plurality of matched filters.

6. The method according to claim 5, further comprising communicating said channel assignment identification data to said central processor from at least one of said monitoring stations.

7. The method according to claim 1, wherein said generating step further comprises synchronizing a time stamp generator at each of said monitoring stations.

8. The method according to claim 7, wherein said time stamp is a time offset value representing an timing offset relative to a time synchronization signal.

9. The method according to claim 8, further comprising calculating at said central processor a position of said source location using said time offset communicated from each of said plurality of matched filter receivers.

10. The method according to claim 8, further comprising said step of calculating at said central processor a time difference of arrival of said signal at each matched filter receiver based on a difference in said time offsets.

11. The method according to claim 1, wherein said plurality of nominal but arbitrary lightning waveforms are selected from said group comprising cloud-to-ground type lightning and cloud-to-cloud type lightning.

12. A system for identifying a source location of lightning, comprising:
three or more monitoring stations positioned at different spaced apart geographic locations, each said monitoring station including a matched filter receiver comprising a radio signal receiver coupled to a plurality of matched filters;
each of said matched filters having a filter characteristic matched to a different one of a plurality of nominal but arbitrary lightning waveforms corresponding to one of a plurality of different types of lightning occurrences;
scaling circuits for scaling a signal energy in a filter channel respectively provided for each of said matched filters to compensate for known predetermined unequal signal energy associated with each said type of lightning occurrence;
a time stamp generator configured for generating at each said monitoring station a time stamp value;
a correlation processor configured for assigning said time stamp value to a peak output of one of said plurality of matched filters having a largest correlation value among a plurality of outputs of said plurality of matched filters;
a data transceiver configured for communicating said time stamp value to a central processor configured for determining said source location based on said time stamp values.

13. The system according to claim 12, wherein a frequency response function for each of said matched filters respectively maximizes an output peak-signal-to-mean-noise ratio for each of said different types of lighting occurrence.

14. The system according to claim 12, wherein each of said matched filters has an impulse response function that is said image of a waveform respectively associated with each said type of lightning occurrence.

15. The system according to claim 14 wherein said image is said same as said receive signal run backward in time starting from a fixed time.

16. The system according to claim 12, further comprising channel assignment identification means for generating in each of said matched filter receivers a channel assignment identification data specifying a lightning type based on a comparison of correlation value output from said plurality of matched filters.

17. The system according to claim 16, wherein said data transceiver is further configured for communicating said channel assignment identification data to said central processor from at least one of said monitoring stations.

18. The system according to claim 11, wherein said monitoring station further comprises at least one timing system for receiving and extracting a timing signal for synchronizing a time stamp generator.

19. The system according to claim 18, wherein said time stamp is a time offset value representing a timing offset relative to said time synchronization signal.

20. The system according to claim 12, wherein said plurality of nominal but arbitrary lightning waveforms are selected from said group comprising cloud-to-ground type lightning and cloud-to-cloud type lightning.

21. A monitoring station for use in a system for identifying a source location of lightning, comprising:
a matched filter receiver comprising a radio signal receiver coupled to a plurality of matched filters, each of said matched filters having a filter characteristic matched to a different one of a plurality of nominal but arbitrary lightning waveforms corresponding to one of a plurality of different types of lightning occurrences;
scaling circuits for scaling a signal energy in a filter channel respectively provided for each of said matched filters to compensate for known predetermined unequal signal energy associated with each said type of lightning occurrence;
a time stamp generator configured for generating at each said monitoring station a time stamp value;
a correlation processor configured for assigning said time stamp value to a peak output of one of said plurality of matched filters having a largest correlation value among a plurality of outputs of said plurality of matched filters.

22. The monitoring station according to claim 21, further comprising a data transceiver configured for communicating to a central processor said time stamp value and a channel identification corresponding to a particular matched filter.

23. The system according to claim 21, wherein said plurality of nominal but arbitrary lightning waveforms are selected from said group comprising cloud-to-ground type lightning and cloud-to-cloud type lightning.

24. The system according to claim 21, wherein each of said matched filters has an impulse response function that is said image of a waveform respectively associated with each said type of lightning occurrence.

* * * * *